Feb. 6, 1962
R. E. MILFORD
3,020,486
CATHODE FOLLOWER CIRCUIT HAVING TRANSISTOR
FEEDBACK STABILIZATION
Filed Jan. 30, 1958

Inventor:
Richard E. Milford
by Morton D. Morse
His Attorney

United States Patent Office 3,020,486

Patented Feb. 6, 1962

3,020,486

CATHODE FOLLOWER CIRCUIT HAVING TRANSISTOR FEEDBACK STABILIZATION

Richard E. Milford, Schenectady, N.Y., assignor to General Electric Company, a corporation of New York Filed Jan. 30, 1958, Ser. No. 712,251

2 Claims. (Cl. 330—3)

The present invention relates to an amplifier circuit and, more particularly, to a cathode follower circuit having a transistor feedback connection.

Where a high degree of precision is required to couple a low value of signal from a high impedance source to a low impedance measurement or other utilization circuit, it is necessary to employ circuit elements that do not load the source or otherwise attenuate or distort the signal. For example, where it is desired to measure the output generated by a quartz crystal force transducer, an amplifier is required having extreme gain stability, wide band frequency response, the ability to drive a substantially large output cable capacitance, and a high value of high to low impedance transformation ratio. An amplifier having characteristics as set forth in such example may be used advantageously in many types of systems.

It is, therefore, an object of the present invention to provide an amplifier circuit of the cathode follower type utilizing a degenerative feedback circuit to increase and stabilize the gain and to decrease the output impedance without sacrificing voltage gain.

Briefly, the invention comprises a cathode follower circuit having a transistor suitably connected to provide supplemental degenerative feedback in the cathode circuit to decrease the output impedance while stabilizing and increasing the overall voltage gain of the circuit.

Figure 1:
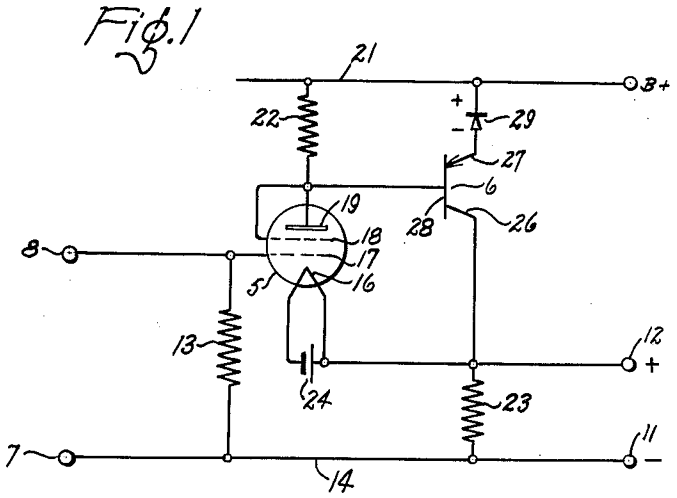
Figure 2:
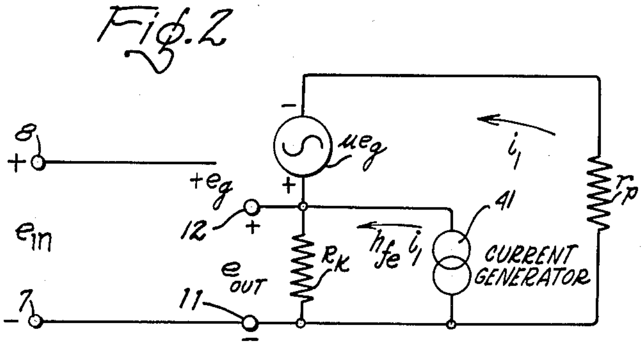

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing in which:

FIGURE 1 is a schematic diagram of a preferred embodiment of the present invention; and FIGURE 2 is an approximate equivalent circuit diagram of the invention of FIGURE 1.

FIGURE 1 shows one embodiment of my invention comprising an electron discharge device 5 and transistor 6 connected in circuit relation, in accordance with my invention, between a pair of input terminals 7 and 8, between which a source of signals may be connected, and a pair of output terminals 11 and 12, from which voltage may be supplied to a desired load (not shown). The source of signals may, as set forth previously by way of example, comprise a high impedance and low current source, such as a piezoelectric quartz crystal force transducer, and the load may be a cable suitably connected to a low impedance measuring or utilization circuit.

An input resistor 13 is connected between the terminals 7 and 8 with one such terminal 7 connected by a lead 14 to a negative terminal of a conventional source of operating potential (not shown). The tube 5 has a filamentary cathode 16, a control grid 17, a screen grid 18, and an anode 19, with the control grid connected to the other input terminal 8. While the tube 5 has been illustrated as a tetrode type, it will be readily apparent that suitable tubes having more or less electrodes may be utilized.

To apply operating potentials to tube 5 a conductor or lead 21 is suitably connected to a positive terminal of the source of operating potential, as conventionally indicated by the symbol B+ on the drawing, and a dropping resistor 22 is connected between such lead 21 and the anode 19 of the tube. Also, a cathode resistor 23 is connected between the cathode 16 of the tube 5 and the input terminal 7 while a source of heater voltage, such as the battery 24, is connected between leads of the filamentary cathode 16. As illustrated, the screen grid 18 of the discharge device 5 is connected to the anode 19.

The circuit as described thus far is a conventional cathode follower circuit with the output voltage developed across the cathode resistor 23, which is common to both the circuit of the anode 19 and the circuit of the control grid 17. To improve the characteristics of such cathode follower circuit a degenerative feedback circuit is utilized to add to the inherent feedback across the cathode resistor 23 and to serve as a current generator controlled by the signal as it is developed at the anode 19 of the tube 5. Such aspect of the invention will be more fully explained hereinafter.

To accomplish the foregoing, the transistor 6 having a collector 26, an emitter 27, and a base 28 is employed and connected as shown. The base 28 is connected to the anode 19 of the tube 5 and thus varies in potential with respect to the potential of input terminal 7 as the anode does. The collector 26 is connected to the cathode 16 of the tube 5 to include the cathode resistor 23 in its circuit. The remaining connection of the transistor 6 is provided by a constant voltage device, such as a Zener diode 29 which is a conventional p-n junction type semiconductor poled in the inverse or high resistance direction, connected between the emitter 27 and the positive potential lead 21. Since the potential across diode 29 is constant irrespective of the current through it, it is utilized to provide a suitable value of operating potential across the transistor 6 between emitter 27 and base 28; i.e., it reduces the operating potential with respect to input terminal 7 applied to emitter 27 to a fixed value lower than that existing on conductor 21. The voltage developed across the cathode resistor 23 and thus between the output terminals 11 and 12, which may be connected to different points on resistor 23, is a replica of the input signal between the terminals 7 and 8 and is in phase therewith.

Now, consider the operation of the invention with suitable operating potentials applied and a source of signals impressed between the input terminals 7 and 8. A positive or positive-going signal at the terminal 8 and hence at grid 17 produces increased current through the tube 5 and resistances 22 and 23 resulting in a decreased potential at the anode 19 and an increased potential at the cathode 16. The decreased potential at the anode 19 is applied to the base 28 of the transistor 6 to increase the potential between base 28 and emitter 27 thereby to increase the flow of current in the collector 26. Since the cathode resistor 23 is in the circuit of collector 26 of the transistor 6, current flows from the collector through resistor 23 in such a direction as to raise the positive potential of the cathode 16 of the tube 5, thus augmenting the increase in potential produced by increase in current flowing from cathode 16 through resistor 23.

For a better understanding of the operation of the invention and the advantageous results achieved, reference is made to the approximate equivalent circuit of FIGURE 2 wherein $r_p$ is the value of the plate impedance of the tube 5, $\mu$ is the amplification factor of the tube 5, $R_k$ is the value of the cathode resistor 23, and $h_{fe}$ is a parameter of the transistor 6, sometimes assigned the symbol $h_{21}$ in text books, and is the common emitter current transfer ratio of the transistor 6 as determined by measuring the ratio of the collector output alternating current to the base input alternating current with the output short-circuited for alternating current. In FIGURE 2 the transistor 6 is represented by its equivalent current generator 41 producing a current of a value equal to $h_{fe}i_1$, where $i_1$ is the current flowing through tube 5. Both the currents $i_1$ and $h_{fe}i_1$ flow through the cathode resistor 23 ($R_k$) in the same direction to provide increased degenerative feedback.

By applying formulae well known in the art the overall gain of the conventional cathode follower circuit is expressed by:

$$\frac{e_{out}}{e_{in}}=\frac{1}{1+\frac{1}{\mu}+\frac{1}{g_mR_k}} \quad (1)$$

Where $g_m$ is the mutual transconductance of the tube 5, and the effective output impedance is expressed by:

$$R_{EFF}\approx\frac{1}{g_m} \quad (2)$$

Now, by establishing the following relationship with respect to the input impedance of the transistor 6:

$$R_{IN}<<r_p+R_k<R_1 \quad (3)$$

where $R_1$ is the value of the dropping resistor 22 of the tube 5, and with respect to the cathode resistor 23 ($R_k$):

$$R_k<<\frac{1}{h_{ob}(1+h_{fe})} \quad (4)$$

where $h_{ob}$, also assigned the symbol $h_{22}$ in some text books, is the common base output admittance of the transistor 6, the foregoing gain and output impedance expressions (Equations 1 and 2 are favorably altered.

To a very good approximation the overall gain of the cathode follower circuit with the transistor 6 becomes:

$$\frac{e_{out}}{e_{in}}=\frac{1}{1+\frac{1}{\mu}+\frac{1}{g_mh_{fe}R_k}} \quad (5)$$

and the effective output impedance is expressed by:

$$R_{EFF}\approx\frac{1}{g_mh_{fe}} \quad (6)$$

Thus, by using a transistor 6 having a value of common emitter transfer ratio $h_{fe}$ in the neighborhood of 50, or more, the last term of the denominator in the expression for gain, Equation 5 above, becomes negligible to increase substantially the overall gain, and the effective output impedance is substantially reduced as indicated by Equation 6. Also, it is to be noted that the overall gain, Equation 5, then becomes substantially independent of the mutual transconductance $g_m$ of the tube 5 and is more dependent upon the more stable amplification factor $\mu$ of such tube.

In addition to the increase in overall gain and decrease in the effective output impedance of the cathode follower type of circuit, it has been found by measurements that favorable frequency response also results with the addition of the transistor 6. For a particular type of transistor, 2N43, the response was measured and found to decrease from a substantially constant value by only 3 decibels from a frequency of zero to 1 megacycle per second and for another type of transistor, 2N136, the response was found to decrease from a substantially constant value by only 3 decibels from a frequency of zero to 2.5 megacycles per second. Such frequency responses are adequate for applications of the present invention.

As an application of the present invention, by way of illustration only, a circuit was constructed in accordance with the foregoing to couple signals from a piezoelectric crystal force transducer to a cable connected to a force measuring circuit. In such application the various elements had types and values as indicated in the following list:

Resistor 13, $10^{11}$ ohms
Tube 5, electrometer type, CK5886 having an amplification factor ($\mu$) approximately equal to two and a mutual transconductance ($g_m$) approximately equal to 100 micromhos Resistor 22, 0.1 megohms
Operating potential, 45 volts between leads 14 and 21
Battery 24, 1.34 volts
Transistor 6, 2N43 having a common emitter current transfer ratio approximately equal to 50
Diode 29, Zener diode, 20 volts constant voltage
Resistor 31, 10,000 ohms.

By inserting the applicable values into the expressions for overall gain and effective output impedance, Equations 1 and 5 and 2 and 6, respectively, as set forth in the foregoing, it may be calculated that the addition of the transistor 6 to the cathode follower circuit increases the gain from approximately 0.40 to 0.67 and, also, decreases the effective output impedance from substantially 10,000 ohms to 200 ohms. Measurement of such quantities were substantially equal in value to those calculated.

While the present invention is particularly applicable to cathode follower circuits utilizing electrometer tubes having a substantially low value of mutual transconductance and of current, it is not limited thereto as the principles set forth are applicable wherever circuit parameters are within the relationships set forth at (3) and (4) above and suitable operating potentials for the transistor 6 are readily available.

While particular embodiments of this invention have been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In combination, an electrometer tube having at least an anode, a cathode and a control electrode, a transistor having an emitter, a collector and a base electrode, a source of operating potential, a first resistance connected between a point on said source and both said cathode and said collector, an anode resistance connected between said anode and a point on said source positive with respect to said first point, means including a high value input impedance connected between said control electrode and said first point for supplying a signal voltage thereto whereby said discharge device operates as a cathode follower to reproduce said signal voltage on said first resistance, and means to impress signal voltage variations appearing on said anode between said emitter and base electrode of said transistor thereby to produce signal variations in current in said collector to augment the signal reproduced on said first resistance, said first resistance having a comparatively small value with respect to said input impedance.

2. In a cathode follower circuit, the combination comprising an electrometer tube having a substantially low value of mutual transconductance and at least a cathode, control grid and anode, a cathode resistor connected between said cathode and a first terminal of a source of operating potential, means including a high value input impedance coupled between said control grid and said first terminal for applying an input signal, said input impedance being comparatively large with respect to the value of said cathode resistor, a second terminal of said source of operating potential positive with respect to said first terminal connected to said anode through a dropping resistor, and a transistor having a collector, emitter and base with said collector connected to said cathode to include said cathode resistor in its circuit, said base connected to said anode to receive voltage variations in response to said signal, and said emitter connected to said source of operating potential through a constant voltage device, whereby current of said collector and said cathode flow in the same direction through said cathode resistor to increase and stabilize the gain of the circuit and decrease the effective output impedance.

(References on following page)

References Cited in the file of this patent

UNITED STATES PATENTS

| | | |
|---|---|---|
| 2,714,702 | Schockley | Aug. 2, 1955 |
| 2,737,547 | Deming | Mar. 6, 1956 |
| 2,775,656 | Hounsfield | Dec. 25, 1956 |
| 2,788,397 | Chauvin et al. | Apr. 9, 1957 |
| 2,810,071 | Race | Oct. 15, 1957 |
| 2,855,468 | Lohman | Oct. 7, 1958 |
| 2,863,008 | Keonjian | Dec. 2, 1958 |
| 2,874,236 | Sikorra | Feb. 17, 1959 |
| 2,879,410 | Loeb | Mar. 24, 1959 |

FOREIGN PATENTS

| | | |
|---|---|---|
| 142,153 | Australia | July 11, 1951 |
| 150,232 | Australia | Feb. 23, 1953 |

OTHER REFERENCES

Starke, "The Transistor D.C. Amplifier," Radio and Television News, December 1953, pages 82, 83, 148–151.

Langford-Smith, "Radiotron Designer's Handbook," fourth edition, 1952, pages 307, 311, 312, 315.